United States Patent

Mauch et al.

[15] 3,685,021

[45] Aug. 15, 1972

[54] METHOD AND APPARATUS FOR PROCESSING DATA

[72] Inventors: Harold A. Mauch, Garland; Robert N. Miller, Dallas, both of Tex.

[73] Assignee: International Computer Products, Inc., Addison, Tex.

[22] Filed: July 16, 1970

[21] Appl. No.: 55,445

[52] U.S. Cl...........340/172.5, 340/174.1, 340/146.1

[51] Int. Cl.........G06f 5/02, G06f 11/12, H03r 13/00

[58] Field of Search......340/172.5, 146.1 A, 146.1 F, 340/174.1 B, 174.1 G; 235/152, 153, 154; 346/74 M

[56] References Cited

UNITED STATES PATENTS

| | | | |
|---|---|---|---|
| 3,357,003 | 12/1967 | MacArthur | 340/174.1 |
| 2,813,259 | 11/1957 | Burkhart | 340/174.1 |
| 3,237,176 | 2/1966 | Jenkins | 340/174.1 |
| 3,434,117 | 3/1969 | Gibson et al. | 340/172.5 |
| 2,782,398 | 2/1957 | West et al. | 340/174.1 |
| 2,977,579 | 3/1961 | Mullin | 340/174.1 |
| 3,293,608 | 12/1966 | Klein et al. | 340/172.5 |
| 3,451,049 | 6/1969 | Horning | 340/174.1 |
| 3,562,726 | 2/1971 | Hamilton | 340/174.1 |
| 3,261,003 | 7/1966 | Cogar et al. | 340/172.5 X |

*Primary Examiner*—Paul J. Henon
*Assistant Examiner*—Jan E. Rhoads
*Attorney*—Giles C. Clegg, Jr.

[57] ABSTRACT

A method and apparatus for data encoding and decoding in which a quaternary logic system is used for processing binary data. Two data channels are used to provide four combinations of data, two of which represent binary values, logic "0" and logic "1," a third of which provides a guard band between bits of information and the fourth of which is a special character.

28 Claims, 13 Drawing Figures

INVENTORS
HAROLD A. MAUCH
ROBERT N. MILLER

ATTORNEY

INVENTORS

HAROLD A. MAUCH
ROBERT N. MILLER

Giles C. Clegg, Jr.
ATTORNEY

INVENTORS
HAROLD A. MAUCH
ROBERT N. MILLER

INVENTORS
HAROLD A. MAUCH
ROBERT N. MILLER
Giles C. Clegg Jr.
ATTORNEY

INVENTORS
HAROLD A. MAUCH
ROBERT N. MILLER

[signature]
ATTORNEY

METHOD AND APPARATUS FOR PROCESSING DATA

BACKGROUND OF THE INVENTION

The present invention relates to the processing of serial data and more particularly to improved data coding system based on a quaternary logic system. The present invention is especially adapted to cassette magnetic tape systems, but also has application to data communication systems or other types of storage medium such as, for example, punched tape, inked tape, photosensitive tape.

At the present time, the systems used for writing and reading information onto a recording media are generally one of three types. In the first system, the data is recorded on one channel and clock pulses are recorded on an adjacent channel. In a RB system (return to bias) a pulse is provided each time a selected bit occurs. In the NRZ system (non return to zero) there is a change in level each time the bit character changes. Gaps are provided in the data channel between bytes of information and longer gaps are provided between blocks or records. The recovery of data is time independent, but delimiting (separation of data) is time dependent. Further, it is difficult to detect errors due to loss of clock or data pulses. In a second system called the NRZI system, on one channel a state change occurs each time a binary "1" occurs and on the other channel a state change occurs each time a binary "0" occurs. In this system, the recovery of data is sequential and not time dependent. However, it is generally necessary to resort to gaps in order to distinguish between bytes and blocks of data and accordingly, the delimiting of data is time dependent. Detection of errors is difficult and reading of information is often of questionable reliability.

Still a third type of system is referred to as a bi-phase system. In the bi-phase system, the clock and data pulses are combined into one channel with at least one state change occurring each bit period. A binary "1" is distinguished from a binary "0" by an additional state change during the bit period. A modification of this system is the Manchester Code. Such systems are completely time dependent both in terms of recovery of data and in terms of delimiting. Errors are difficult to detect in such systems.

SUMMARY OF THE INVENTION

The present invention provides a method and apparatus for processing binary data on at least two channels which is self-clocking and time independent both during the recovery of data and during delimiting, as between bytes or blocks of data. In accordance with the present invention, a serial binary data train to be processed is encoded with a train of clock pulses and a train of delimiter pulses. A clock related pulse is provided in synchronism with each bit of binary data and at least one delimiter pulse is provided having a predetermined relationship to each block of binary data. The blocks of binary data can be of various lengths. Thus, in some instances, it is desirable to provide a delimiter pulse at the beginning or end of each byte of of binary data while in other instances only one marker pulse would be provided with each record or a group of records. While it is necessary, in accordance with the principles of the present invention, to provide at least one delimiter pulse between each adjacent pair of blocks of data to be delimited, it is not necessary to have a delimiter pulse at the beginning and end of the serial data train as the absence of data pulses can be detected to provide a delimiting function. The binary data, clock pulses, and delimiter pulses are encoded to produce first and second outputs each having high and low states. If two channels are used, four possible data states are provided in a quaternary coded format. One of the data states is used to provide a space between bits of data or marker data. Two of the data states represent the two binary digits "1" and "0." The fourth data state represents a special character used, for example, in delimiting and referred to herein as a delimiter.

The two outputs are recorded or transmitted on two channels using conventional techniques. When the intelligence on the two channels is read, it is decoded to obtain desired outputs containing separate streams of binary data, clock pulses and delimiter pulses which can be used, as necessary, for further processing of the data.

Additional data states in excess of four can be obtained by providing more than two channels in order to obtain delimiter pulses of different character for different types of delimiter or different categories or levels of data.

The binary data can include a parity bit for error checking. The present invention further provides improved error checking capabilities made possible by the time independent delimiting.

Many objects and advantages of the invention will become apparent to those skilled in the art as a detailed description of the preferred embodiment of the invention unfolds in conjunction with the appended drawings wherein like reference numerals denote like parts and in which:

DESCRIPTION OF A PREFERRED EMBODIMENT OF THE INVENTION

Figure 1:
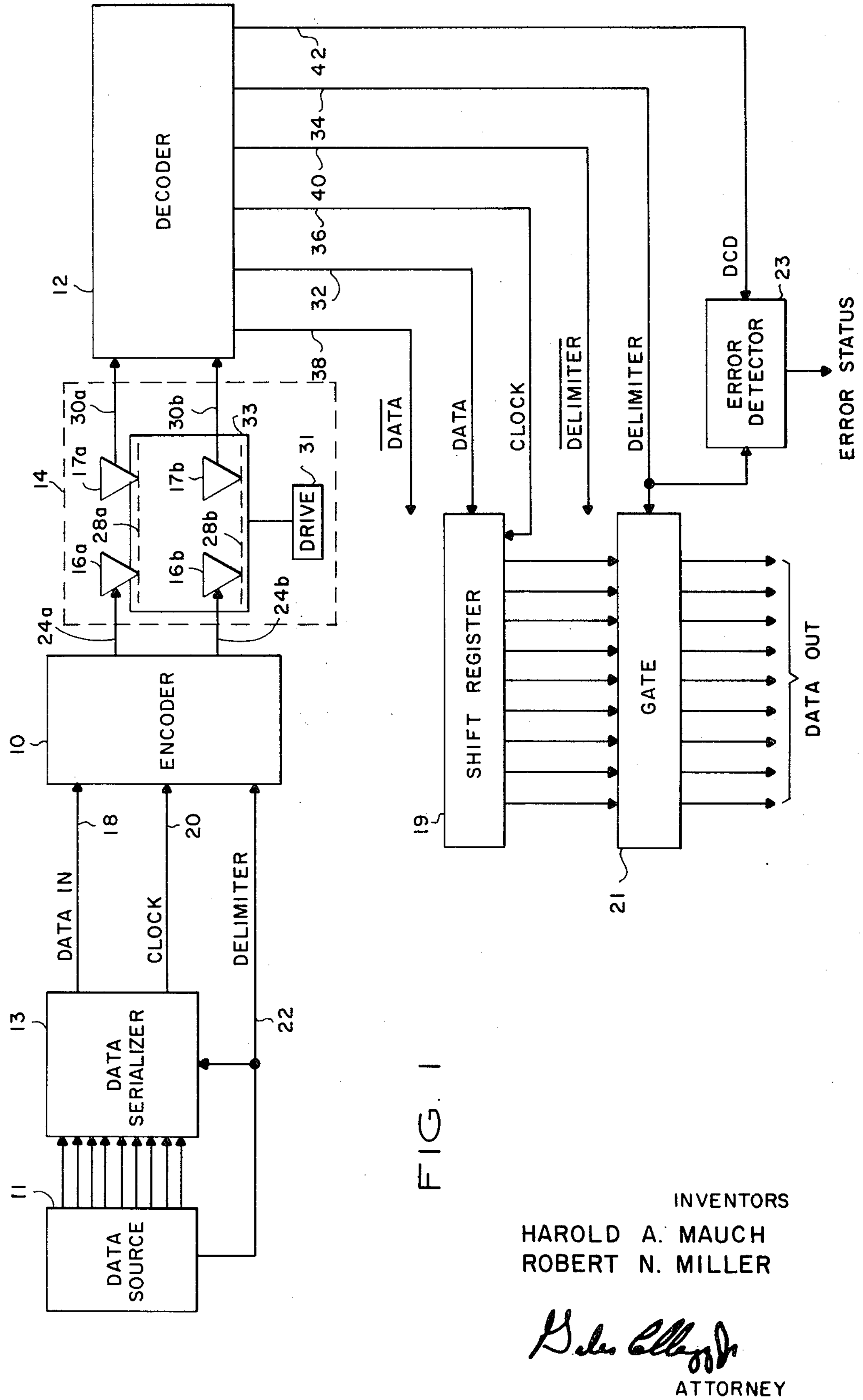
FIG. 1 is a block diagram illustrating the principals of the present invention.

Apparatus in accordance with the preferred embodiment of the invention comprises as its essential elements encoder 10, decoder 12 and a data processing means 14 for either recording or transmission of the data. The data processing means includes a pair of transducers 16a and 16b for applying the encoded signals to channels A and B of a recording or transmission medium and a pair of transducers 17a and 17b for reproducing of information obtained from the two channels.

Data to be processed, either by recording or transmission, is usually provided in parallel form from a data source 11, such as a central processing unit. The parallel data is applied to a data serializer 13 of convention design which supplies to encoder 10 a stream of serial binary data on line 18 and a stream of clock related pulses on line 20. The clock related pulses are produced in synchronism with the data bits. If the clock pulses are of the desired pulse width, they can function as the clock related pulses. The clock pulses themselves will, in many instances, not be of the desired pulse width and the clock pulses can be used to trigger a suitable pulse generating circuit, such as a one shot multivibrator for generating clock related pulses in synchronism with the data bits which are of the desired pulse width.

A stream of delimiter pulses is applied to encoder 10 on line 22. At least one delimiter pulse is provided between each pair of adjacent blocks of data. A delimiter pulse may be provided at the beginning of a stream of data or at the end of a stream of data but is not required as the absence of data can be used for delimiting. It is practical to use a signal conventionally applied from a data source to a data serializer when data is available for serialization as the delimiter pulse.

The encoder 10 has a plurality of outputs commensurate with that required to accommodate the signals to be encoded. Thus, in accordance with the specific embodiment of the invention shown, four outputs states are required and two encoder outputs are provided, each of which have possible high and low states. The number of possible outputs states varies as $2^n$ whose $n$ is the number of encode outputs. Thus, if three encode outputs were provided, eight output states would be available for different types of delimiter or different categories or levels of data. In the specific example shown encoder 10 includes a pair of output lines 24a and 24b each having high and low states thereby establishing four possible states in a quaternary binary format.

The four possible output states are as shown in Table I below, which also indicate the use of the different output states.

TABLE I

| Channel A | Channel B | Output State | Name |
|---|---|---|---|
| 0 | 0 | 0 | BLANK (B) |
| 1 | 0 | 1 | DATA RESET (R) or (0) |
| 0 | 1 | 2 | DATA SET (S) or (1) |
| 1 | 1 | 3 | DELIMITER (D) |

Output states 1 and 2 are the data codes representing binary "1" and "0" respectively. Output state 3 is a delimiter used as a special search or separation code.

Output state 0 is a blank which is interposed between any other pair of output states and provides isolation between bits of data. Provision of the blank between each bit of data allows for different propagation times in transmission systems and head or tape skew that can shift the time phase relationship of track A relative to track B in recording systems. Such shifts in recording or transmission systems can cause the blank to be distorted. However, data and delimiter codes are useable so long as these conditions are not destroyed by the blank being overlapped.

The encoder outputs on lines 24a and 24b are applied by transducers 16a and 16b to channels A and B respectively for processing by data processing means 14. The data processing means includes a transducer means 16a–16b for writing of data on channels A and B respectively and transducer means 17a–17b for reading of the data processed. The data processing means can be a communications system with the transducers at the terminals or, as indicated schematically in the specific example, a recording system in which data is written on tracks 28a and 28b of a recording medium 33 and read from such channels as drive 31 produces relative movement between the medium 33 and the transducers 16a–16b and 17a–17b.

During the read mode, information obtained from channels A and B by transducers 17a and 17b is applied on lines 30a and 30b to the inputs of a decoder 12. The outputs of the decoder are a stream of data on line 32, a stream of delimiter pulses on line 34 and a stream of clock pulses on line 36. Exemplary of other outputs which can be provided are $\overline{\text{DATA}}$ on line 38, $\overline{\text{DELIMITER}}$ on line 40 and a DCD (data - clock - delimiter) pulse on line 42. A DCD pulse appears each time a clock or delimiter pulse is decoded. The clock pulses can be used for transferring the data or $\overline{\text{DATA}}$ streams into a shift register 19 or other utilizing equipment in conventional manner. Delimiter pulses can be used for delimiting by, for example, enabling a gate 21 connected to the parallel outputs of shift register 19. In accordance with a preferred embodiment of the invention, the DCD pulse stream and delimiter pulse stream are applied to an error detector circuit 23 used in an error check procedure.

Figure 2:
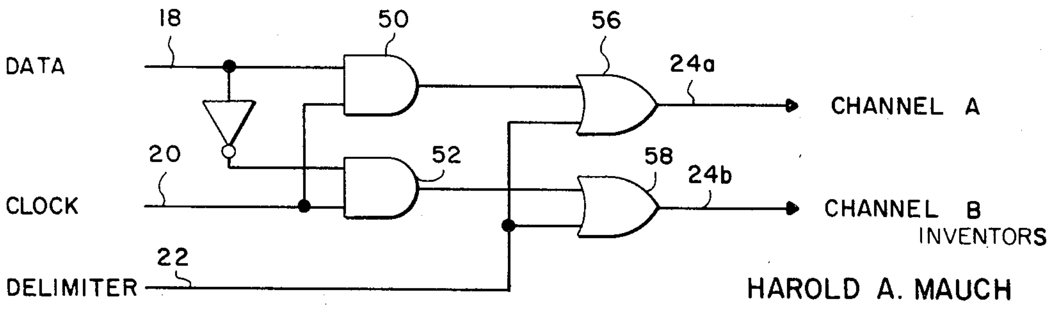
FIG. 2 is a block diagram schematically illustrating one embodiment of an encoder in accordance with the present invention.

Referring now to FIG. 2 of the drawings, the encoder in accordance with a preferred embodiment of the invention is shown in block diagram form and includes a pair of AND gates 50 and 52. A stream of clock related pulses is applied to one input of each of the AND gates 50 and 52 on line 20. A stream of serial data bits is applied to the other input of AND gate 50 on line 18. Line 18 is also connected through inverter 54 to the other input of AND gate 52 such that it receives a stream of inverted data bits. The output of AND gate 50 is applied to the other input of an OR gate 56. The output of the AND gate 52 applied to the other input of an OR gate 58. The stream of delimiter pulses is applied to the other input of each of the OR gates 56 and 58 on line 22. The outputs of OR gates 56 and 58 are output lines 24a and 24b respectively.

Figure 3:
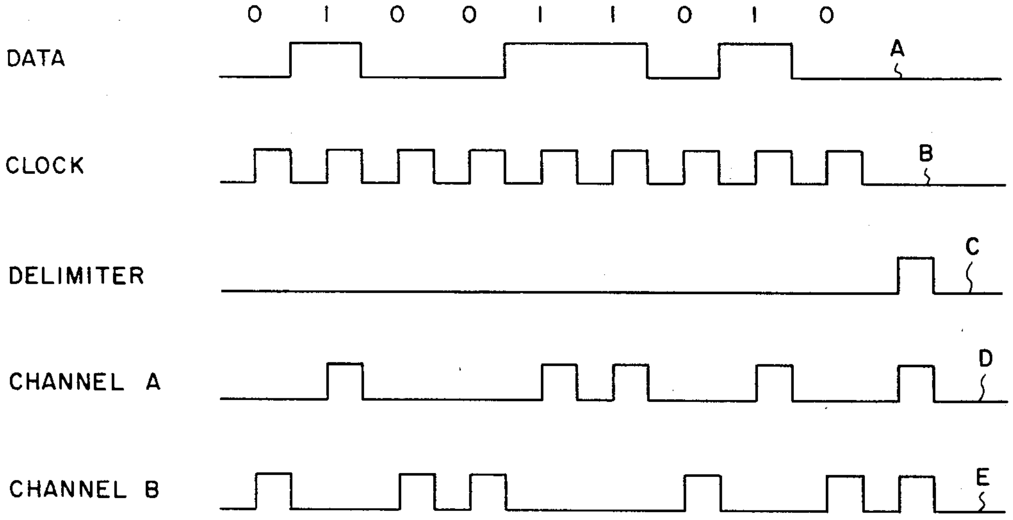
FIG. 3 is a group of curves illustrating exemplary inputs of the encoder of FIG. 2 and the resulting outputs.

Referring to the curves of FIG. 3, there is illustrated in Curve A an exemplary byte of data comprising nine bits. In the specific example shown, nine bits are provided in order to accomodate an eight bit word and a parity bit. However, the number of bits in a byte can vary depending upon the particular applications. It is not necessary that the data be divided into bytes but rather it can be handled as extended blocks of information which could include several records.

As indicated in Curve B of FIG. 3, a clock related pulse is provided in synchronism with each of the data bits. For reasons which will be explained in greater detail, the clock related pulses are of lesser width than the bit period and the clock related pulses are preferably about one-half of the bit period.

As shown in Curve C, there is provided at least one delimiter pulse having a predetermined relationship with each block of binary data. In the specific example shown, the block of data is one byte, but as mentioned above, it is possible for a block of data to include many bytes or many records. In the specific example shown, the delimiter pulse is used as a separation code for separating adjacent blocks of data and it follows the last binary bit in the block of data under consideration.

It can be seen by reference to curves D and E of FIG. 3 that each bit period is divided into two segments at the outputs of the encoder. A pulse appears only on channel A, output state 2, in synchronism with each binary "1" in the bit stream and a pulse appears only on channel B, output state 1, in synchronism with each binary "0" in the bit stream. Pulses appearing on channels A and B in synchronism with the data bits are of the same pulse width as the clock related pulses. The portion of any bit period in excess of the pulse width of the clock pulse appears as a blank, output state 0, providing positive separation between adjacent bits. The isolation between bits of data and delimiters permits phase or skew errors in recording systems and differences in propogation times in transmission of data. Further, identical wave forms are obtained if the data is read in the reverse direction. The reliability of reading and writing of data therefore is optimized. Preferably, the clock related pulses are one-half the period of the data bits in order to maintain maximum data density with maximum protection against erroneous reading or writing of information. Pulses appear on both channels A and B, output state 3, when a delimiter pulse is present.

Figure 4:
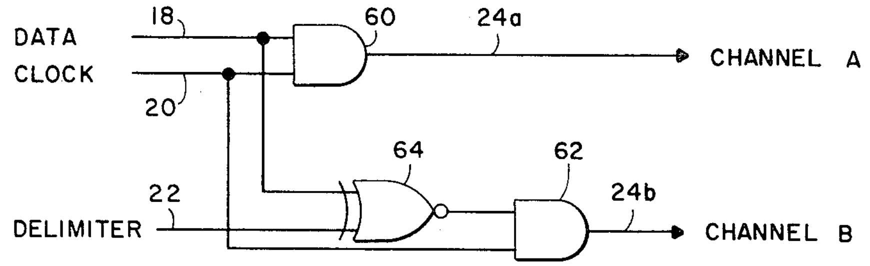
FIG. 4 is a block diagram illustrating an alternative encoding device in accordance with the present invention.

An alternative encoder is shown in FIG. 4 of the drawings wherein line 20 is connected to one input of each of AND gates 60 and 62. Line 22 is connected to one input of exclusive OR gate 64. Line 18 is connected to one input of AND gate 60 and to one input of the exclusive OR gate 64. The outputs appearing on lines 24a and 24b responsive to different combinations of inputs are as shown in Table II below. It can readily be seen that in the circuit of FIG. 4, the data and clock pulses gate the delimiter line. The encoder of FIG. 4 has the advantage of allowing the data source to control marker generation. Such is particularly advantageous when multiple delimiters are to be generated.

TABLE II

| DATA | CLOCK | MARKER | CHANNEL A | CHANNEL B |
|---|---|---|---|---|
| 0 | 0 | 0 | 0 | 0 |
| 0 | 0 | 1 | 0 | 0 |
| 0 | 1 | 0 | 0 | 1 |
| 0 | 1 | 1 | 0 | 0 |
| 1 | 0 | 0 | 0 | 0 |
| 1 | 0 | 1 | 0 | 0 |
| 1 | 1 | 0 | 1 | 0 |
| 1 | 1 | 1 | 1 | 1 |

From the foregoing, it will be apparent that many different circuit arrangements can be devised for performing the encoding function. It is only necessary that the desired number of output states, in the specific example four, be provided by the encoder and that the intimate relationship between the data bits and clock pulses be maintained. The particular manner in which the encoder is implemented will vary dependent upon system requirements and the function or use assigned to the data states.

Figure 5:
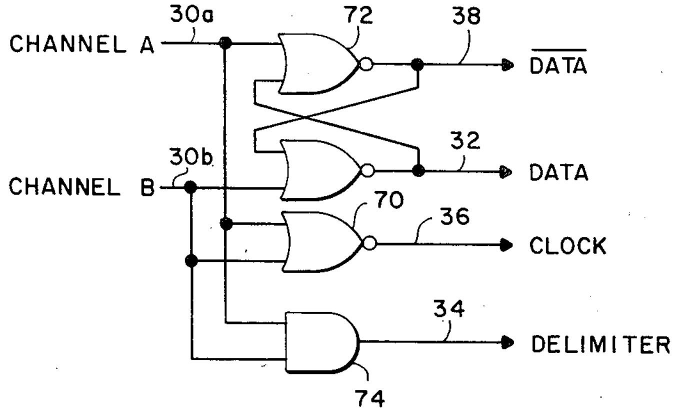
FIG. 5 is a block diagram illustrating a decoder in accordance with the present invention.
Figure 6:
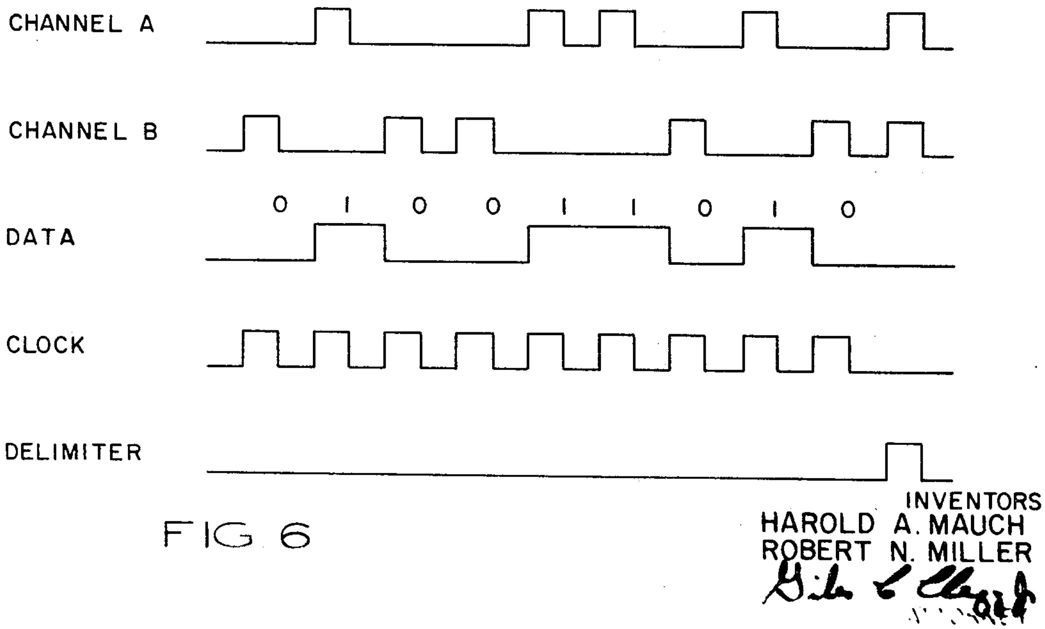
FIG. 6 is a group of curves illustrating the operation of the decoder of FIG. 5.

A simple decode circuit illustrating the decoding process in accordance with the preferred embodiment of the invention is shown in FIGS. 5 and 6 of the drawings. In the circuit of FIG. 5, both lines30*a* and 30*b* are connected to respective inputs of an exclusive OR gate 70. The output of gate 70 is line 36 on which appears the clock pulses. Lines 30*a* and 30*b* are also connected to the inputs respectively of a cross-coupled latch 72 whose two outputs are line 32 and 38 on which appear DATA and $\overline{\text{DATA}}$ information. Lines 30a and 30b are further connected lines +*the inputs of an AND gate 74 whose output is line 34 on which appears marker pulses.*

Referring to FIG. 6, it can be seen that a clock pulse is produced on line 36 each time that a pulse is available on either line 30a or line 30b but not both. At the end of a byte comprising, for example, nine bits, nine clock pulses would be present on line 36. A delimiter pulse is produced in line 34 when pulses are available on both lines 24*a* and 24*b*. It can also be seen that in the circuit of FIG. 5, pulses on line 24*a* set the cross coupled latch and pulses on line 24*b* re-set the latch. The decoding process depends upon the sequence in which events occur rather than time relationships. Accordingly, if the data rate were to change or be varied, the only effect would be to produce a corresponding change in the rate of the recovered data and clock pulses. This feature of the invention makes it feasible to provide additional intelligence by varying the period between clock pulses in a manner similar to that of a biphase system. The additional information can be used, for example, to increase recording density, for filing marking or distance marking, to provide redundant writing and reading of data for error checking, or to provide analog information in combination with digital information. The data bits and clock pulses remain intimately related without regard to variation in the period between clock pulses and are detectable as long as the individual pulses applied to the decoder are detectable. Any skew between the two channels manifests itself as an irregularity in spacing between clock pulses but the data and clock are unmistakably coherent up to the point which the separate pulses on the two channels overlap.

The circuit of FIG. 5 is not preferred in that a very small amount of skew between the two chennels will result in the marker pulses producing erroneous clock and data pulse indications. Since the existence of a marker is indicated by simultaneous presence of pulses on the two channels, skew will cause the appearance of pulses on only one line before and after coincidence of the two pulses, generating extra data bits and clock pulses.

Figure 7:
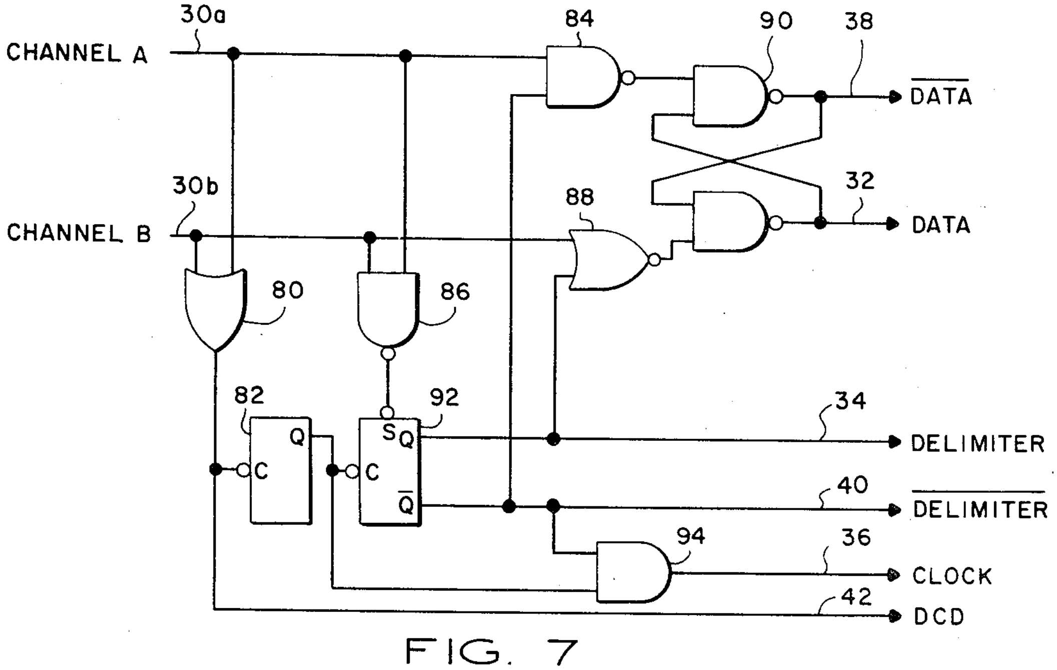
FIG. 7 is a block diagram illustrating the preferred decoder in accordance with the present invention.

A preferred example of a decode circuit is as shown in FIG. 7 of the drawings. Lines 30*a* and 30*b* are each connected to respective inputs of an OR gate 80 whose output is connected to the input of a one shot multivibrator 82 and to line 42. Line 30*a* is connected to one input of an NAND gate 84 and to one input of a NAND gate 86. Line 30b is connected to the other input of NAND gate 86 and to one input of NOR gate 88. The output of the NOR gate 88 is connected to one input of a cross-coupled latch 90 comprising a pair of NAND gates. The output of NAND gate 84 supplied as an opposite input to the latch 90. Two outputs of the latch 90 are lines 32 and 38 on which appears DATA and $\overline{\text{DATA}}$ information.

The output of the one shot multivibrator 82 is connected to the clock input of a flip-flop 92. The output of NAND gate 86 is applied to the set input of flip-flop 92. The Q output of flip-flop 92 is connected to line 34 on which appears the delimiter pulses. A $\overline{Q}$ output of flip-flop 92 is connected to line 40 on which appears the $\overline{\text{DELIMITER}}$ pulses. The $\overline{Q}$ output of flip-flop 92 is also connected to the other input of NAND gate 84 and to one input of an AND gate 94. The Q output is also connected to the other input of NOR gate 88. The output of one shot multivibrator 82 is also connected to the other input of AND gate 94. The output of AND gate 94 is connected to line 36 on which appears the clock pulses.

Figure 8:
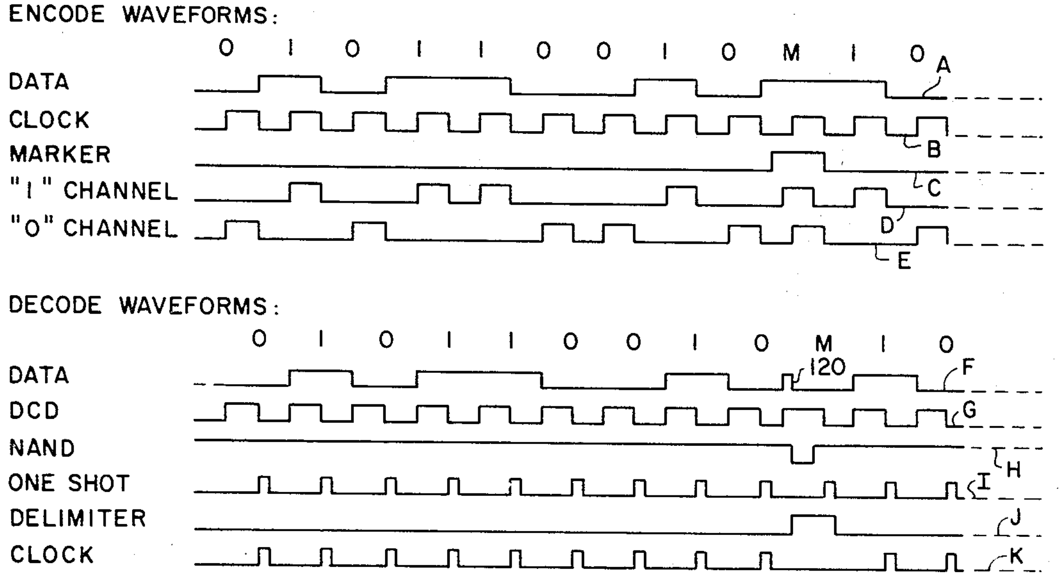
FIG. 8 is a group of curves illustrating operation of the decoder of FIG. 7; and, FIG. 9 is a block diagram illustrating a preferred error detection circuit in accordance with the present invention.

Referring now to FIG. 8 of the drawings, it can be seen that any time a pulse is present on either line 30*a* or 30*b* a DCD (data-clock-delimiter) output pulse will be produced on line 42 connected to the output of the OR gate as indicated in Curve G of FIG. 8. The negative going edge of each of the pulses produced at the output of the OR gate is applied to the one shot to cause the one shot to produce pulses as shown in Curve I of FIG. 8. An output pulse from the one-shot causes the $\overline{Q}$ output of flip-flop 92 to be raised and accordingly an output from the AND gate 94 is obtained at all times except when a delimiter pulse is present, providing clock pulse outputs on line 36 in synchronism with each data bit, as shown in Curve K of FIG. 8. When a delimiter pulse is present, as indicated by a pulse being present on both of lines 30*a* and 30*b*, the output of NAND gate 86 will become negative setting the flip-flop 92 and causing an output to be produced at its Q output which appears on line 34 as a delimiter pulse. The delimiter pulse will have a duration commencing at the time the NAND gate goes negative, as indicated in Curve H, and extending until the next pulse from the one shot goes negative as shown in Curve J in FIG. 8. So long as the flip-flop 92 is in the reset condition, the pulses appearing on line 30*a* will be applied through NAND gate 84 to the latch 90 and the pulses appearing on line 30*b* will be applied through the NOR gate 88 to the other input of the latch 90. Each time that the pulse appears on line 30*a*, the latch will produce an output on line 32 which terminates upon the occurrence of a pulse on line 30*b*. Thus, as shown in Curve F of FIG. 8, the binary data appearing on line 32 is substantially the same as the binary data applied to the encoder on line 18, the only difference being the presence of a pulse 120 having a period equal to that of any skew in the two channels. It is important to note, however, that a clock pulse is not produced in synchronism with pulse 120 and the pulse 120 will not be clocked into or out of a shift register or other device which operates on the binary data.

It will be appreciated that many different implementations of the decoder can be used and will be obvious to those skilled in the art, depending upon the particular functions assigned to the different output states, the number of output states utilized and the over-all system requirements. It will be readily apparent that the data bits and clock pulses can easily be recovered if the delimiter pulses identified by output state 3 were not present and that to extract the delimiter pulse without creating extraneous data bits or clock pulses adds to the complexity of the decoder. Exemplary of other methods of recovery of the marker pulse would be to force a certain amount of skew between the two channels. One of the pulses would be forced to precede the pulse from the other channel by a predetermined amount. This would provide assurance that the spurious data would always occur in the same fashion, and would result in either an ODI or an IDO sequence which would be predictable. The particular sequence could also be keyed to character parity. Such a method would have the disadvantage of requiring the marker pulse to occupy a greater portion of the record than a clock related pulse and would not be feasible in system applications requiring a continuous clock.

The nature of errors in data resulting from drop-out of data bits or clock pulses, particularly in digital cassette recording, is such that the probability of several bits being subject to drop out is greater than the probability of a single bit being lost, assuming conventional recording densities. As a result of this, single bit parity checking methods are only partially effective. The marker pulse utilized in accordance with the principals of the present invention which is not intimately related to the data, renders it feasible to provide an improved method of error detection which is much more reliable than the single bit parity methods and which does not adversely effect the density at which intelligence is stored.

In accordance with the error detection method of the present invention, a delimiter pulse is used to bracket a block of data bits. The count of a number of clock pulses which lie between the delimiter pulses may be compared with a known number of bits which should lie between the delimiter pulses. This method of error checking is very effective because the data and clock pulses recorded or transmitted are intimately related and therefore, a drop-out or drop-in affects both the data and clock pulses identically. Counting the clock pulses yields information about the presence or absence of both the data bits and the clock pulses. The delimiter pulse is a very positive delimiter providing a positive means by which the clock pulse count may be initiated and terminated.

Figure 9:
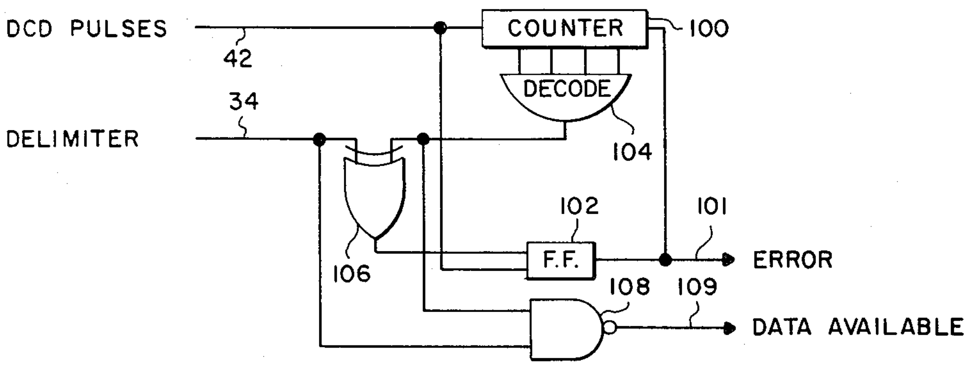

A preferred example of error detection circuit is shown in FIG. 9 of the drawings. The DCD pulses on line 42 are applied to the input of a counter 100. The DCD pulses are also applied to the strobe input of a D-type flip-flop 102. The output of the flip-flop 102 is applied to reset the counter 100 and as an error indicating signal on line 101. The capacity of the counter 100 is preferably equal to $n+1$ where $n$ is the number of bits in a block and, in accordance with the preferred example of the invention is a decade counter. The outputs of counter 100 are applied through a decode circuit 104 which produces an output when the count in the counter equals $n+1$. The output of the decode circuit 104 is applied to one input of an exclusive OR circuit 106. The output of the decode circuit 104 is also applied to one input of a NAND gate 108. Line 34 on which the marker pulses appear is applied to the other input of each of the exclusive OR gate 106 and the NAND gate 108.

In accordance with the specific example of the invention shown in FIG. 9, the data is handled in 9 bit bytes, one of which may be a parity bit with a delimiter pulse between each byte. After nine pulses have appeared on line 42, a marker pulse should appear on line 34 concurrent with a tenth DCD pulse if no data bits or markerpulses have been lost or if extraneous data bits or marker pulses have not been erroneously recorded and read. As a result of simultaneous appearance of pulses on line 34 and the output of the decode circuit 104, the output of the NAND gate 108 will become more negative providing a signal on line 109 to the processing unit or other utilizing equipment that the byte of data read is not in error and data is available.

Figure 10A:
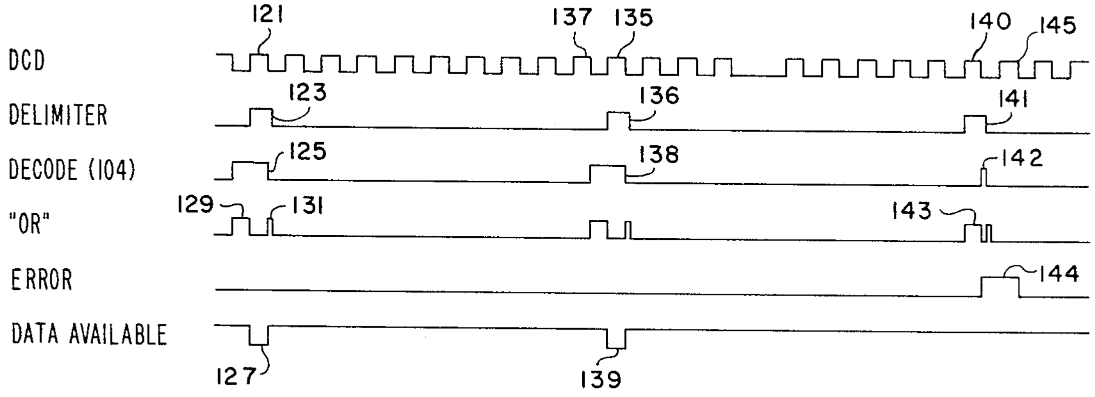
FIGS. 10*a*–10*d* are curves illustrating error detection.

The foregoing can best be understood with reference to the curves of FIG. 10*a*. A DCD pulse 121 is produced on line 42 and a delimiter pulse 123 on line at the end of the preceding block of data. The decode circuit provides an output 125 since the count of the counter is 10 ($n+1$). While the decode pulse 125 and the delimiter pulse 123 delimiter coexistent a pulse 127 is provided on line 109, indicating that data is available. It will be noted that pulses 129 and 131 are produced at the output of the exclusive OR gate 106. Pulse 129 commences at the leading edge of pulse 125 and ends when pulse 123 appears. Pulse 131 commences at the end of pulse 125 and ends at the end of pulse 123. Since a DCD pulse is not present when an output appears at OR gate 106, the state of flip-flop 102 is not affected by pulses 129 or 131. If the next byte is error free, as indicated the tenth DCD pulse, indicated at 135, will occur in coincidence with delimiter pulse 136. The counter 100 is set to a count of ten at the trailing edge of pulse 137 and reset to a count of one at the trailing edge of pulse 135. A data available output signal 139 is provided on line 109 at the output of NAND gate 108 since a delimiter pulse 136 and an output pulse 138 from decoder 104 are co-existent.

If a one bit drop out error occurs, the decoder 104 would not provide an output until the trailing edge of pulse 140. If the delimiter pulse 141 is slightly wider than pulse 140, a very short decode pulse 142 will be produced. However, upon the trailing edge of pulse 140 going negative, flip-flop 102 will be set, providing an error signal 144 on line 101. The error signal will continue until flip-flop 102 is reset at the negative going trailing edge of DCD pulse 145. Counter 100 is set to a count of two by the negative going trailing edge of pulse 144 and if the next byte is error free a delimiter pulse will be coexistent with an output from the decode 104 and a data available pulse will be produced.

Figures 10B, 10C:
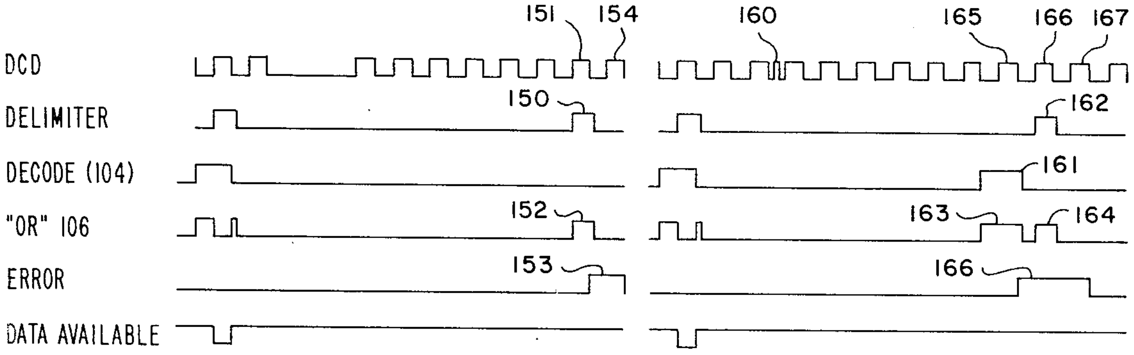

The wave forms produced as a result of drop out of two bits is shown in FIG. 10*b*. Thus, the number of pulses applied to the counter during the count cycle will only be eight and an output will not be produced by decoder 104 during the existence of a delimiter pulse 150. At the negative going edge of pulse 151 flip-flop 102 will be set since an output pulse 152 is available from OR gate 106, providing an error indication, pulse 153. At the trailing edge of pulse 154 the flip-flop will be reset and upon termination of pulse 153 the counter will be set to a count of two, by pulse 153 as pulse 154 is the second pulse to occur on line 42 since a decode would have occurred if no error was present.

A one bit drop in error, as produced by an extraneous pulse 160 will result in a decode pulse 161 being initiated and terminated prior to occurrence of a delimiter pulse 162. The exclusive OR gate 106 will provide output pulses 163 and 164 which are co-extensive with pulses 161 and 162 respectively. At the trailing edge of DCD pulse 165 the flip-flop will be set producing an error indication 166. At the trailing edge of DCD pulse the flip-flop will not be reset as pulse 164 is present. The flip-flop will be reset at the trailing edge of pulse 167 and the counter set to a count of two, placing the counter count and the delimiter pulse in synchronization.

Figure 10D:
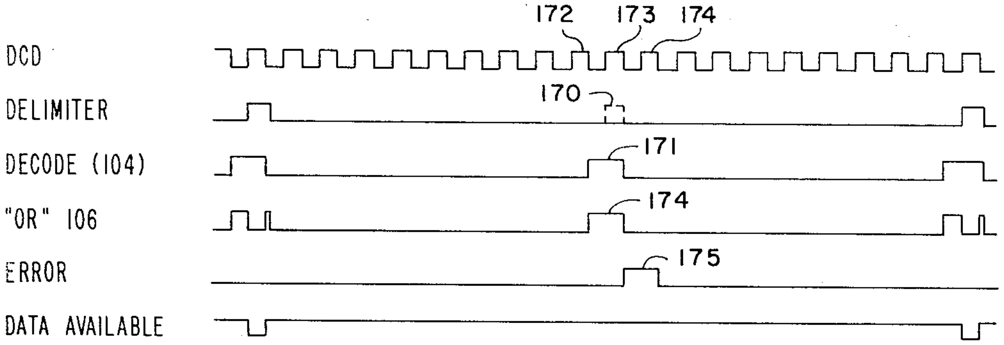

FIG. 10*d* illustrates error detection when a delimiter pulse 170, indicated in phantom, is dropped out. A decode pulse 171 is produced at the trailing edge of pulse 172, resulting in an output pulse 174 from exclusive OR gate 106. At the trailing edge of DCD pulse 173 the flip-flop will be set, providing an error pulse 175. Error pulse 175 resets the counter to a count of two and clamps it at that count preventing it responding to DCD pulses. The flip-flop will be reset at the trailing edge of pulse 174 removing the error signal and releasing the counter. It will be noted, in this regard that without the reset the count in the counter would attain a count of two at the trailing edge of DCD pulse 174, but is inhibited from doing so by the error output.

In the foregoing description reference has been made to setting a count to certain levels and providing a decode output when the count attains certain levels. It will be obvious that only the number of pulses applied to the counter is of interest and accordingly it would be possible to set the counter to a high number and decode at a lower number with the count being reduced as DCD pulses are applied. It is practical particularly in those instances where the data is in blocks of variable length, to preface each block of data with a number indicating the number of bits in the block and set the counter to provide a decode output when that number of data bits have been received.

It can be seen from the foregoing that the present invention provides a greatly improved method and apparatus for processing serial binary data. An important advantage of the invention is that content of the information recorded is not affected by the rate, density or the duration of the recorded impulses. Time is not a factor neither in recognition of data nor the delimiting of data. An important advantage of the present invention is that the superior delimiting renders it feasible to count the bits in each block of information and compare the count against a known number for determining if extraneous bits were generated or if bits were dropped.

Although the invention has been described with a particular preferred embodiment thereof, many changes and modifications will become apparent to those skilled in the art in view of the foregoing description which is intended to be illustrative and not limiting of the invention defined in the claims.

What is claimed is:

1. A method, which is substantially independent of time and data density and velocity, for processing serial binary data that comprises the steps of:

a. providing a clock related pulse in synchronism with each bit of serial binary data to be processed;
b. controlling the pulse width of each clock related pulse to be less than the bit period of the bit of binary data with which it is associated;
c. providing a first pair of outputs each having high and low states;
d. controlling one of said outputs to be of a high state when a clock related pulse is present;
e. selecting the one of said outputs which is of a high state when a clock related pulse is present in accordance with the character of the binary bit associated with the clock related pulse to provide at said first pair of outputs first and second complimentary pairs of output states representative of the two possible states of the binary data;
f. providing at least one delimiter pulse in predetermined relationship to each block of serial binary data being processed;
g. providing at said first pair of outputs a third pair of output states in which the two outputs are the same responsive to the presence of a delimiter pulse;
h. providing at said first pair of outputs a fourth pair of output states complimentary to the third pair of output states between any two other pairs of output states;
i. applying the first pair of outputs to first and second write transducers respectively;
j. producing relative movement between said first and second write transducers and a recording medium for recording the output states of said first pair of outputs on first and second record channels of said recording medium; and
k. controlling the skew of said first and second transducers relative to said recording medium to insure that said fourth pair of output states is always recorded between any two other pairs of output states which are recorded.

2. A method as defined in claim 1 further including the step of producing the fourth pair of output states between occurrence of clock related pulses.

3. A method as defined in claim 1 further including the step of producing a delimiter pulse between each pair of bytes of serial binary data.

4. A method as defined in claim 1 further including the step of reading the information recorded on said two record channels of the recording medium to provide pairs of output states on a second pair of outputs and decoding the pairs of output states appearing on the second pair of outputs to produce a stream of serial binary data corresponding to the stream of serial binary data being processed, a stream of clock data including a clock pulse in synchronism with each bit of binary data and a stream of delimiter pulses each having the same predetermined relationship to blocks of serial binary data being processed.

5. A method as defined in claim 1 further including the steps of passing the recording medium past first and second read transducers to produce at a second pair of outputs pairs of output states corresponding to states recorded on the two channels of the recording medium and asynchronously producing binary data in serial form on a data channel directly and without time dependence in response to changes in the states of the second pair of outputs between said first and second pairs of output stages.

6. A method as defined in claim 5 further including the step of asynchronously producing a clock pulse on a clock channel directly and without time dependence each time one of said first and second pairs of output states is present at said second pair of outputs and terminating each said clock pulse upon occurrence of said fourth pair of output states at said second pair of outputs.

7. A method as defined in claim 6 further including the step of using the clock pulses to control the shifting of data in serial form into means for converting the data to parallel form.

8. A method as defined in claim 7 further including the step of asynchronously initiating a delimiter pulse on a delimiter channel directly and without time dependence each time the third pair of output states is present in said second pair of outputs and terminating said delimiter pulse upon occurrence of said fourth pair of output states at said second pair of outputs.

9. A method as defined in claim 8 further including the steps of converting the serial binary data to parallel form and applying the data in parallel form to a utilizing device upon occurrence of a delimiter pulse.

10. A method as defined in claim 8 further including the steps of counting the number of clock pulses which occur during time intervals between delimiter pulses and applying the data in parallel form to a utilization device only if the count upon occurrence of a delimiter pulse is at a predetermined number.

11. A method as defined in claim 5 further including the step of asynchronously initiating a delimiter pulse on a delimiter channel directly and without time dependence each time the third pair of output states is present in said second pair of outputs and terminating said delimiter pulse upon occurrence of said fourth pair of output states at said second pair of outputs.

12. A method as defined in claim 11 further including the steps of initiating on a clock two channel a clock two pulse each time one of said first, second and third pairs of output states is present at said second pair of outputs and terminating said clock two pulse upon occurrence of said fourth pair of output states at said second pair of outputs.

13. A method as defined in claim 12 further including the step of generating a clock one pulse of predetermined duration on a clock one channel upon termination of said clock two pulse.

14. A method as defined in claim 13 further including the step of counting one of the number of pulses appearing on said clock two channel and the number of pulses appearing on the clock one channel following occurrence of a delimiter pulse on said third channel, providing an error signal if the count is different than numbers of a predetermined group upon occurrence of the next delimiter pulse, and providing a data available signal if the count is equal to a predetermined number upon occurrence of the next delimiter pulse.

15. A method as defined in claim 14 wherein the clock two pulses are counted and further including the steps of using said clock one pulses to control the shifting of data in serial form into means for converting the serial bit data to parallel form and applying the data in parallel form to utilizing device upon occurrence of a data available signal.

16. Apparatus Apparatus for processing serial binary data in a manner which is substantially independent of time and data density and velocity of the recording medium that comprises:

a. encoder means for producing at a first pair of outputs four different pairs of output states responsive to signals applied to three inputs;
b. means for applying to a first one of said inputs a stream of serial binary data to be processed;
c. means for producing in synchronism with each bit of binary data to be processed a clock related pulse having a pulse width less than the bit period of the bit of binary data with which it is associated;
d. means for applying each clock related pulse to a second one of said inputs in synchronism with its associated binary bit;
e. means for producing a delimiter pulse in predetermined relationship to each block of serial binary data and applying each delimiter pulse to a third one of said inputs;
f. said encoder means being effective for producing at said first pair of output terminals a first pair of output states responsive to a binary one applied to said first input and a clock related pulse applied to said second input;
g. said encoder means being effective for producing at said first pair of output terminals a second pair of output states responsive to a binary zero applied to said first input and a clock related pulse applied to said second input;
h. said encoder means being effective for producing at said first pair of output terminals a third pair of output states responsive to a delimiter pulse applied to said third input; and
i. said encoder means being effective for producing at said first pair of output terminals a fourth pair of output states during a gap which exists between the end of each clock related pulse and the next succeeding clock related pulse as a result of the pulse width of each clock related pulse being less than the bit period of the bit of binary data with which it is associated.

17. Apparatus as defined in claim 11 further including a first pair of transducers, a recording medium having two record channels, means for producing relative movement between said recording medium and said first pair of transducers, means for energizing said first pair of transducers with said first pair of outputs for recording on said two record channels of said recording medium information corresponding to said pairs of output states appearing at said first pair of outputs with information corresponding to said fourth pair of output states appearing between any two other pairs of information recorded.

18. Apparatus as defined in claim 17 wherein said recording medium is of magnetic material and information is recorded on such magnetic material in the form of two complimentary states.

19. Apparatus as defined in claim 17 further including a second pair of transducer means for producing at a second pair of outputs pairs of output states corresponding to the output states produced at said first pair of outputs with one of said fourth pair of output states appearing between any two other pairs of output stages, and decoder means connected directly to said second pair of outputs and asynchronously controlled by the second pair of outputs for producing on a binary data channel one output state responsive to a first pair of output states appearing at said first pair of outputs and producing a complimentary output state on said output channel responsive to appearance of said second pair of output states on said second pair of output terminals.

20. Apparatus as defined in claim 19 further including means for asynchronously producing on a clock channel a clock pulse each time one of said first and second pairs of output states appear at said second pair of output terminals.

21. Apparatus as defined in claim 20 further including means for asynchronously producing a delimiter pulse on a delimiter channel each time said third pair of output states appears at said second pair of output terminals.

22. Apparatus as defined in claim 19 wherein said decoder means comprises bistable means including two inputs connected to said second pair of outputs by means exclusive of timing devices.

23. Apparatus as defined in claim 20 further including a shift register means having an input connected to said binary data channel and a clock input connected to said clock channel for converting said serial binary data to parallel form.

24. Apparatus as defined in claim 21 further including means for converting the serial binary data to parallel form on a plurality of output lines and gate means connected in said plurality of output lines and enabled by said delimiter pulse for applying binary data in parallel form to a utilizing device.

25. Apparatus as defined in claim 19 further including means responsive to the presence of said third pair of output states at said second pair of outputs for establishing a predetermined state of said binary data channel.

26. Apparatus as defined in claim 19 further including means for initiating on a fourth channel an output pulse each time that one of said first and second and third pairs of output states appears at said second pair of outputs and terminating said output pulse upon appearance of said fourth pair of output states, means for counting the number of pulses which appear on said fourth channel between occurrences of said third pair of output states and means for providing a data available signal only when the count stored in said counter upon occurrence of one of said third pairs of output states is equal to a predetermined number.

27. Apparatus ad defined in claim 26 further including means for generating on a second channel a clock pulse of predetermined pulse width upon termination of each pulse generated on the fourth channel.

28. Apparatus as defined in claim 27 further including a shift register having a data input connected to the data channel and a clock input connected to said second channel and a plurality of output lines connected to a utilization means through a gate means, said gate means being responsive to said data available signal for applying data in parallel form to said utilization means.

* * * * *